United States Patent [19]
Brenneman

[11] Patent Number: 5,971,483
[45] Date of Patent: Oct. 26, 1999

[54] COMBINED RECREATIONAL CHAIR AND TRANSPORT CART

[76] Inventor: Daniel C. Brenneman, P.O. Box 2722, Lakeland, Fla. 33813

[21] Appl. No.: 09/009,194

[22] Filed: Jan. 20, 1998

Related U.S. Application Data

[60] Provisional application No. 60/035,932, Jan. 21, 1997.

[51] Int. Cl.⁶ .................................................. A47C 1/024
[52] U.S. Cl. ................ 297/372; 297/217.1; 297/354.13; 280/47.4
[58] Field of Search .................. 297/27, 28, 354.13, 297/359, 360, 372, 377, 217.1; 280/47.25, 47.29, 47.4

[56] References Cited

U.S. PATENT DOCUMENTS

| | | |
|---|---|---|
| 137,069 | 3/1873 | Goss . |
| 190,788 | 5/1877 | Smith ...................................... 297/372 |
| 587,022 | 7/1897 | Thomas ................................ 297/372 X |
| 664,322 | 12/1900 | Jacobs . |
| 690,012 | 1/1901 | Braymer ................................... 277/372 |
| 1,066,033 | 7/1913 | Nauts .................................. 297/372 X |
| 2,282,270 | 5/1942 | Vallone . |
| 2,916,085 | 12/1959 | Pamcicci ................................ 297/359 |
| 3,015,520 | 1/1962 | Johnson . |
| 3,032,373 | 5/1962 | Danciart et al. . |
| 3,186,757 | 6/1965 | Hopkins ................................... 297/28 |
| 3,984,888 | 10/1976 | DeLano . |
| 4,047,755 | 9/1977 | McDonald et al. ..................... 297/377 |
| 4,482,184 | 11/1984 | Mincey . |
| 4,652,048 | 3/1987 | Nazar . |
| 5,511,849 | 4/1996 | Cahaley et al. . |

FOREIGN PATENT DOCUMENTS

| | | | |
|---|---|---|---|
| 75 991 | 7/1961 | France ................................... 297/377 |
| 445437 | 2/1949 | Italy ....................................... 297/27 |

*Primary Examiner*—Peter R. Brown
*Attorney, Agent, or Firm*—B. G. Colley

[57] ABSTRACT

A recreational chair which is adapted to be folded for storage and useful as transport cart is disclosed. The recreational chair has a seat member with mounted arm rests and an axle with spaced apart wheels. The arm rests have a first pair of pivot pins. There is also a back support member with ends pivotally mounted on the axle and it has a second pair of pivot pins spaced from the axle. Rachet members are mounted on the second pivot pins and the rachet members comprise an elongated member with a central channel interconnected to a first opening which is adapted to receive the first set of pins. A second opening spaced from and remote from the channel is adapted to receive the second set of pins. There is a plurality of slots interconnected to said central channel wherein each slot has a lobular configuration adjacent to the slot opening which inhibits the accidental disengagement of first set of pins so that said back support member can be positioned in a plurality of positions such as a vertically position to use the chair as a transport chair, a horizontal position for storage or sleeping, and angled positions for use as a recreational chair.

8 Claims, 9 Drawing Sheets

COMBINED RECREATIONAL CHAIR AND TRANSPORT CART

CROSS-REFERENCE TO RELATED APPLICATIONS

This application claims the benefit of U.S. Provisional Application Ser. No. 60/035,932, filed Jan. 21, 1997.

BACKGROUND OF THE INVENTION

The present invention relates to a recreational chair and more particularly to a recreational chair that can be used as a transport cart.

There are several recreational chairs in the background art. U.S. Pat. No. 5,511,849 discloses a folding lounge chair with an adjustable back that can be adjusted by moving the armrests to different positions. Also known from U.S. Pat. No. 3,032,373 is a pool chaise lounge that can be folded and adjusted by moving the armrests to different positions. Both of these are constructed of a tubular material and have vinyl or nylon strip connected to the tubes to support the body of the user. Another type of lounge chair is shown in U.S. Pat. No. 2,282,270 where the back of an adjustable pool or beach chair is adjusted by a support device that can be propped in different positions.

One problem that the inventor has observed with the adjustable recreational chairs previously described is that they must be carried to the user's destination which can be very cumbersome to transport to and from the recreational area. The recreational chairs in the background art that have wheels do not have adjustable locking seating mechanisms that allow the seat to be folded for storage and also allow the seat to be opened flat for lying down. Another problem with the previously described recreational chairs that have adjustable seating mechanisms is that they may be accidentally dislodged from their seating positions, thereby creating a possibility of injury. Another problem of the background art chairs observed by the inventor is that they cannot effectively be used to transport items to the recreational area.

The lounge chair that is described herein has many characteristics that are advantageous over prior lounge chairs. The present lounge chair has wheels and can be used as a transport cart to carry items to and from the recreational area. The present invention also includes a ratchet positioning device that allows the user to safely lock the chair in different seating and transport positions. The ratchet positioning device also allows the user to adjust the chair to several seating positions that cannot be accomplished with other recreational chairs known in the art.

SUMMARY OF THE INVENTION

The invention described in this application is an adjustable recreational chair made of lightweight tubular material and has wheels affixed to it to allow it to be used as a transport cart.

This invention incorporates a uniquely designed ratcheting and guidepost mechanism that allows the user to lock the chair in position as a transport cart, adjust the mechanism to a locked three position chair and disengage the mechanism to allow the chair to fold forward the compact storage or back as a fully reclining chair.

DESCRIPTION OF THE PREFERRED EMBODIMENTS

Figure 1:
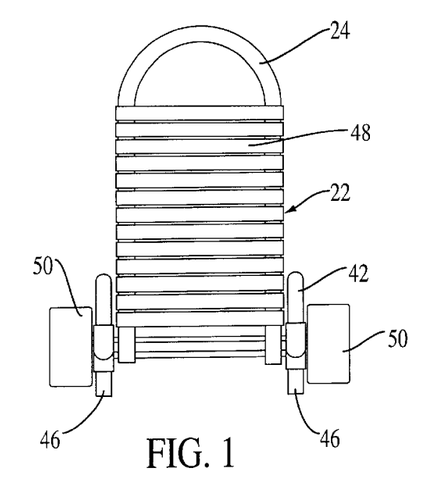
FIG. 1 is a rear elevation view of the recreational chair.
Figure 2:
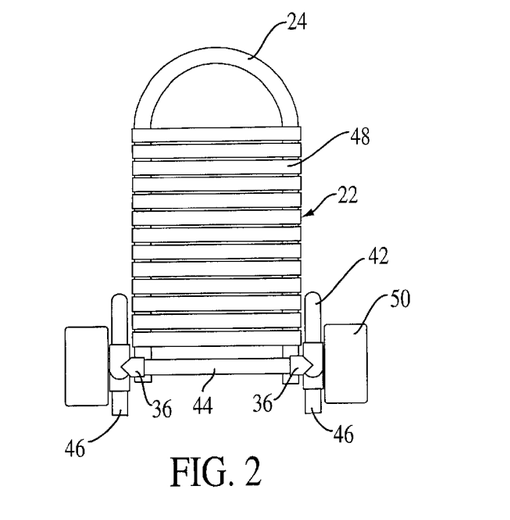
FIG. 2 is a front elevation view thereof.
Figures 3, 4:
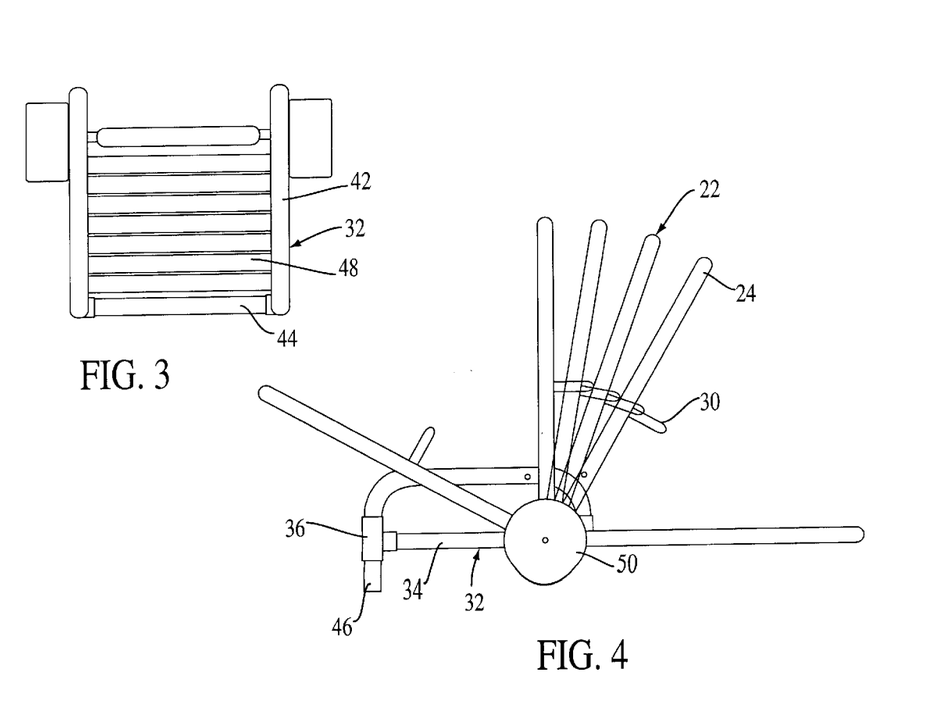
FIG. 3 is a top plan view of the seat support member.
FIG. 4 is a side elevation view of the chair showing the back support member in different positions.
Figure 7:
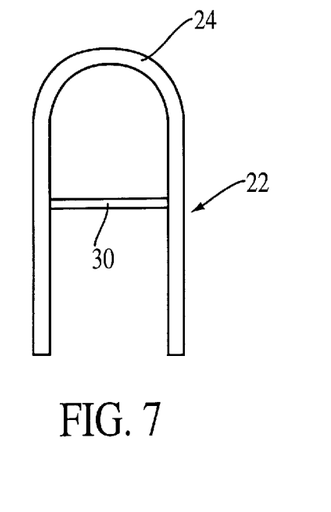
FIG. 7 is a front elevation view of the back support member.
Figure 8:
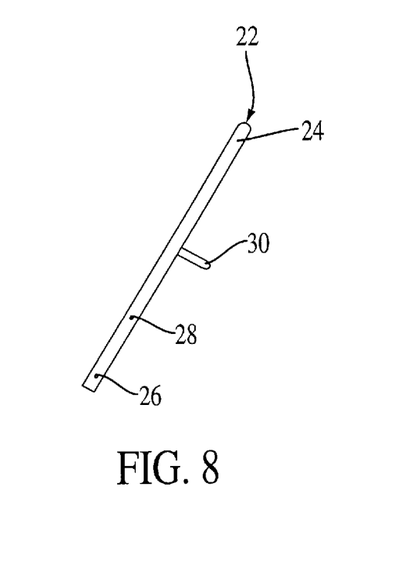
FIG. 8 is a side elevation view of the frame of the back support member.

Referring more specifically to the drawings, the essential components of the recreational chair and transport cart include a back support member, a seat support member, a ground support member, support material, wheels, and a back support member adjusting mechanism also referred to as a ratchet positioning device. These components are described more specifically as follows:

The back support member 22 is depicted in FIGS. 1, 2, 4, 7 and 8. As shown in FIGS. 1, 2, and 7, the back support member has a U-shaped frame 24. This eliminated the need for joints and cuts down on production costs. The frame is constructed of a hollow tubular material, preferably polyvinyl chloride. The frame is curved in the center and has two opposite sides that are of the equal length. On each side of the frame, there are two sets of holes, FIG. 8. The holes are formed on the inner aspect and on the outer aspect of each side. One set of holes 26 is formed more distally to the center of the frame and the other set of holes 20 is formed more proximally to the center. Also shown is FIGS. 4, 7, and 8 is a support bar 30 that connects both sides of the frame of the back support member. The support bar extends outward from the lateral axis of the back support member. The support bar is used to provide stability and support to the back support member when the back support member is in a horizontal position, by making contact with the ground. The support bar may also be used as a rack for towels and other similar items.

Figure 5:
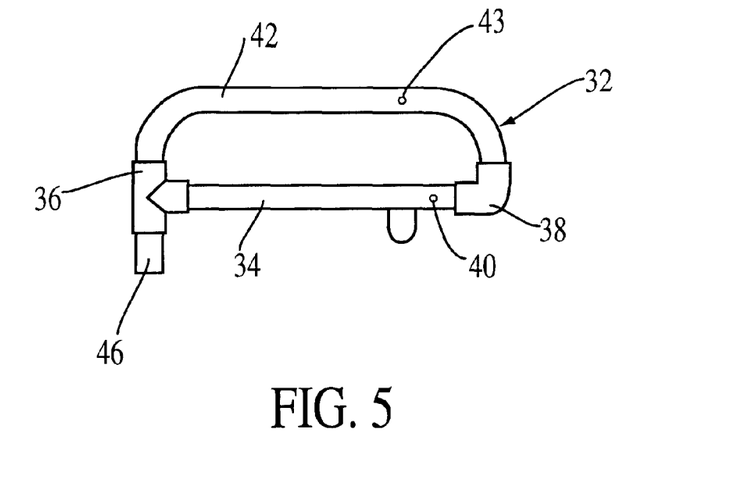
FIG. 5 is a side elevation view of the frame of the seat support member, the opposite side being a mirror image thereof.

There is a seat support member 32 as shown in FIGS. 3, 4, 5, and 6. The seat support also has a frame that is constructed of tubular material, preferably polyvinyl chloride. The frame of the seat support member is comprised of several parts. The frame has two parallel, horizontal sides 34 that are far enough apart so that the seat can accommodate the next portion of a person sitting in it. The forward-most end of each horizontal side inserts into a four way joint 36. The rear-most end of each horizontal side inserts into an L-shaped joint 38. There is a set of holes 40 formed on the inner and outer aspects of the horizontal sides, located proximally to the L-shaped joint, as shown in FIG. 5. The seat support member includes U-shaped armrests 42 that are inserted into the upper-most openings of the forward-most and rear-most joints. Each armrest has a set of holes 43 formed on its inner and outer aspect, more proximally located to the L-shaped joint.

Figure 6:
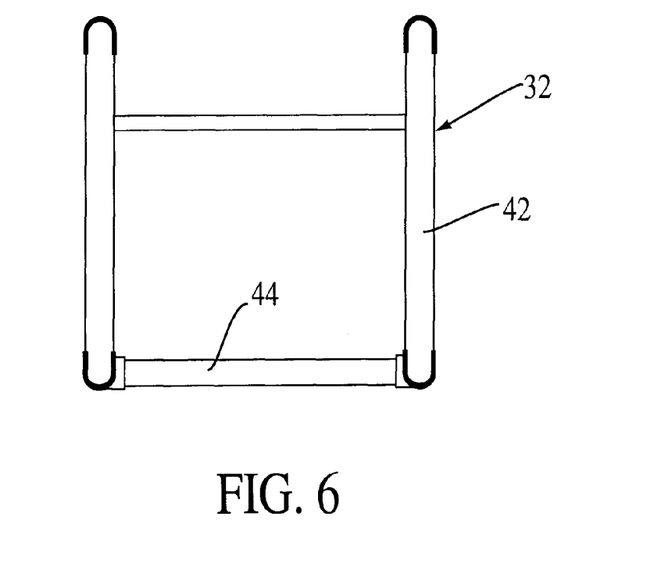
FIG. 6 is a top plan view of the frame of the seat.

As shown in FIGS. 3 and 6, the seat support member also has a hollow horizontal crossbar 44 that is inserted into the inner aspects of the forward-most joints, thereby connecting the horizontal sides of the seat support member. This crossbar provides stability and support and helps maintain the integrity of the seat support member. There are also legs 46, shown in FIGS. 1, 2, 4 and 5 that are inserted into the bottom opening of the forward-most joint.

A support material 48 such as vinyl or cloth is affixed to the frame of the back support member and seat support member to support the body of someone sitting in the chair or to support items that are being transported to the recreational area.

Figure 9:
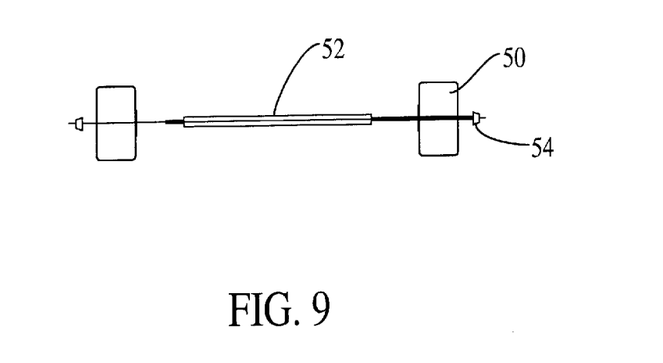
FIG. 9 is a front expanded view of the axle, wheels and tension caps.

There are wheels 50 that are affixed to the chair by an axle 52. The wheel and axle assembly is shown more particularly in FIG. 9. The axle is positioned through the distal holes in frame of the back support member and the holes in the horizontal sides of the seat support member.

The chair is assembled so that the sides of the back support member are affixed to the axle between the sides of the frame of the back support member. Tension caps 54 or such other suitable securing means are used to fasten the wheels on the axle.

Figure 10:
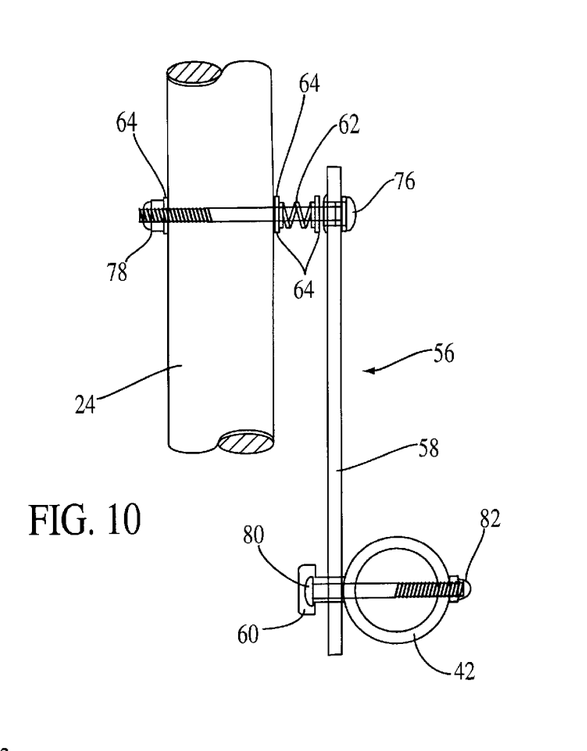
FIG. 10 is a enlarged sectional view of the ratchet positioning device affixed to the back support member and armrest of the chair.
Figure 11:
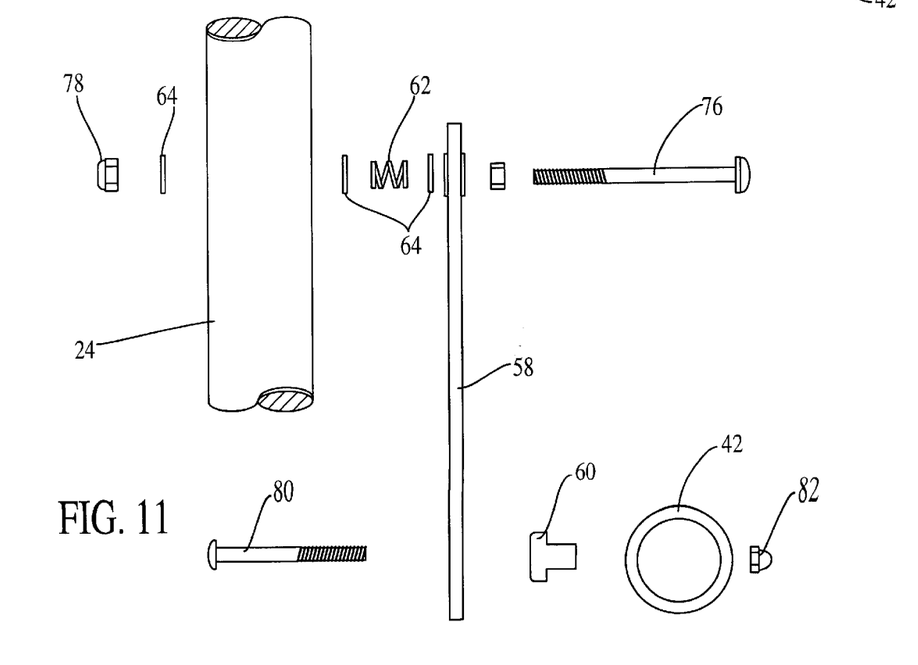
FIG. 11 is an exploded view of the ratchet positioning device.
Figure 12:
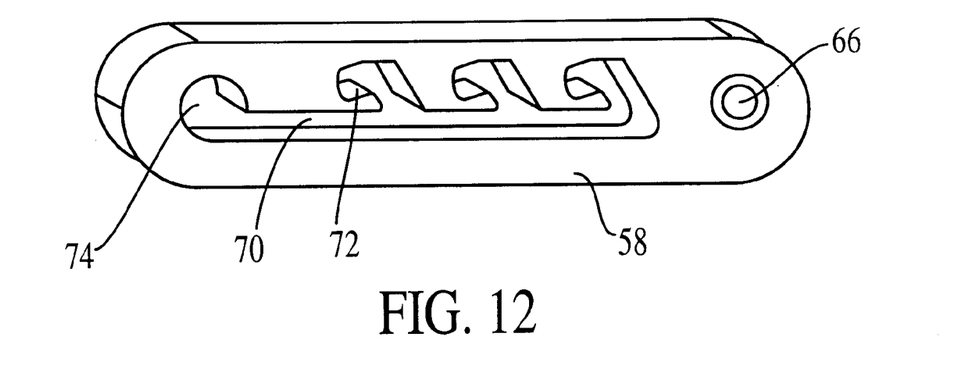
FIG. 12 is a perspective view of the ratchet member.
Figure 13:
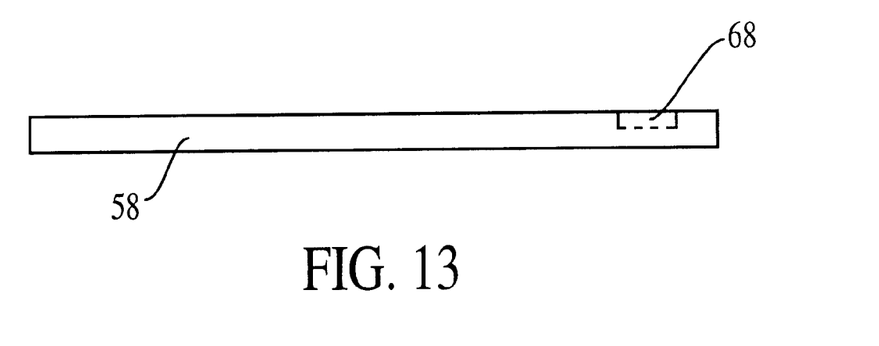
FIG. 13 is a top view of the ratchet member.
Figure 14:
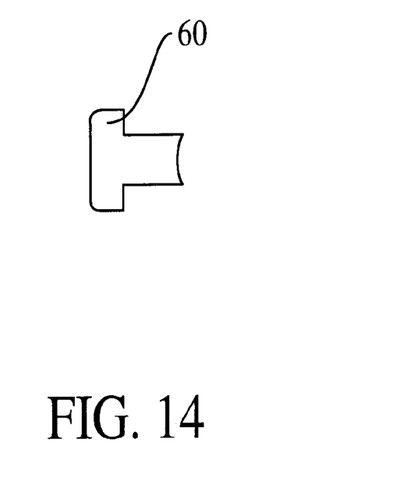
FIG. 14 is a side view of the ratchet positioning guidepost.
Figure 15:
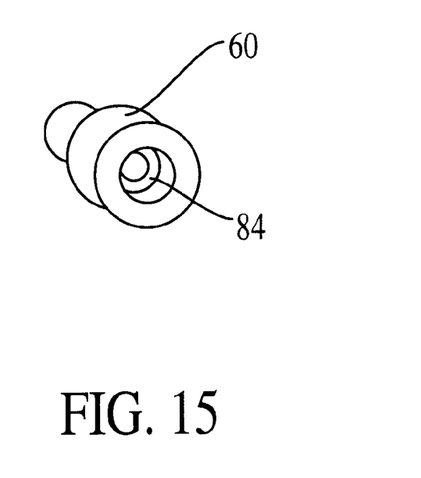
FIG. 15 is a perspective view of the ratcheting positioning guidepost.

The ratchet positioning device 56 is depicted in FIG. 10 and more particularly in FIGS. 11 through 19. The device is comprised of an elongated ratchet member 58, a ratchet positioning guidepost 60, a spring 62, and preferably washers 64 on either side of the spring to help reduce friction. The ratchet member has a swivel hole 66 that is positioned at one end of the member. There is also a recessed area 68 on one side of the swivel hole as shown in FIG. 13. There is a centrally located channel 70 in the ratchet member (FIG. 12). There are slotted areas 72 that extend from the channel. The slotted areas have a lobular shape. The lobular shape of these slotted areas is an important feature of this invention because they allow the ratchet positioning guidepost to be locked securely within them, thereby preventing the back support member from being jarred loose and causing accidental injury to the user of the chair. In order to disengage the ratchet member from the ratchet positioning guidepost, the user of the chair is required to lift the ratchet member up, and move it forward and then down in a continuous motion.

The preferred embodiment depicted in FIG. 12 shows three such slotted areas, however, the invention contemplates that additional slotted areas could be employed in similar applications requiring more positions.

Figure 16:
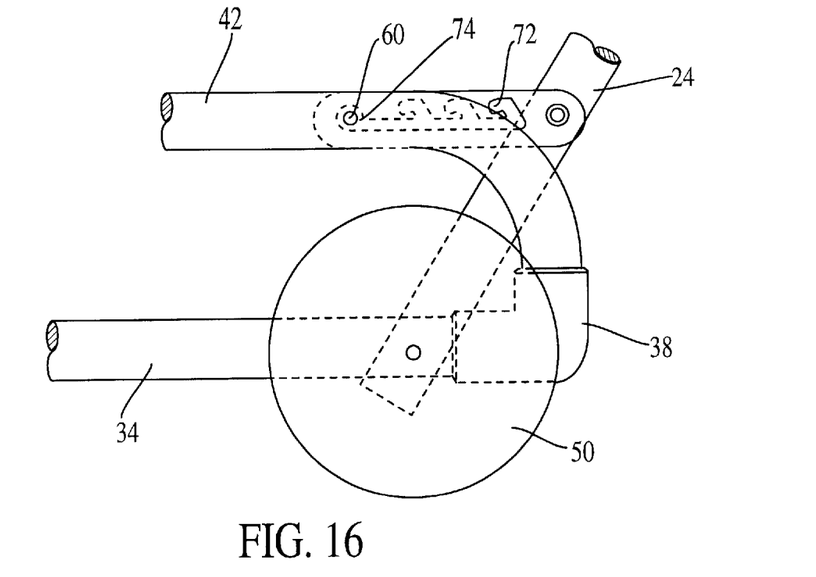
FIG. 16 is a side view of the ratchet positioning device attached to the chair.
Figure 17:
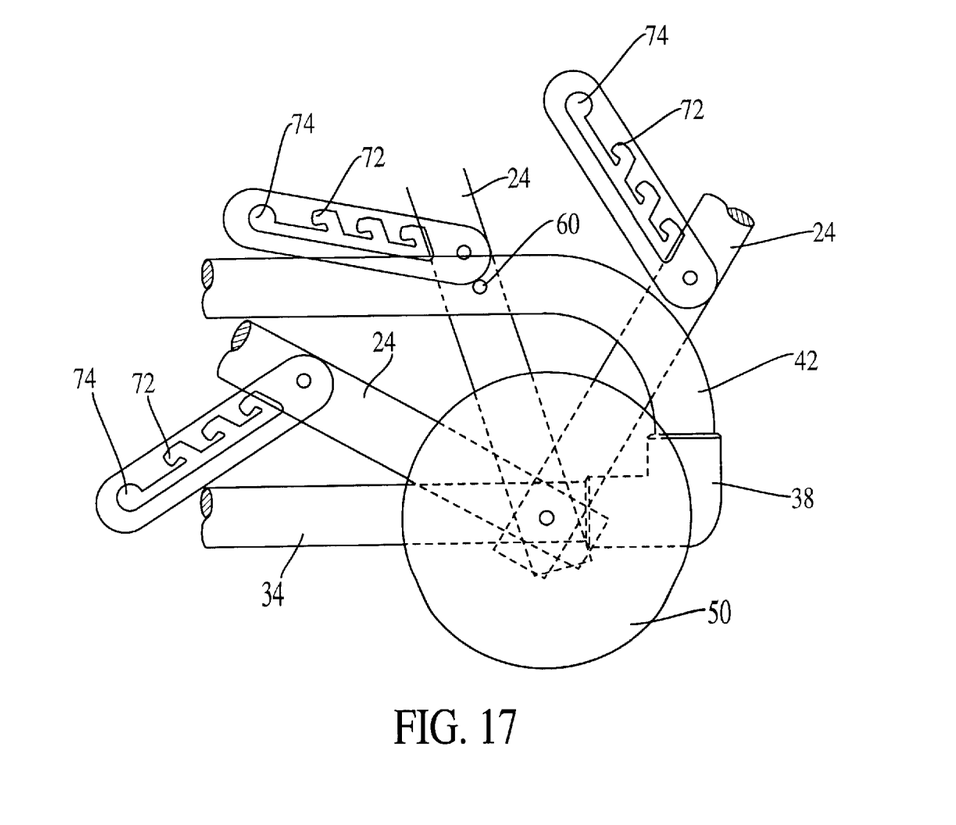
FIG. 17 is a side view of the ratchet positioning device showing the back support member in different movable positions.
Figure 18:
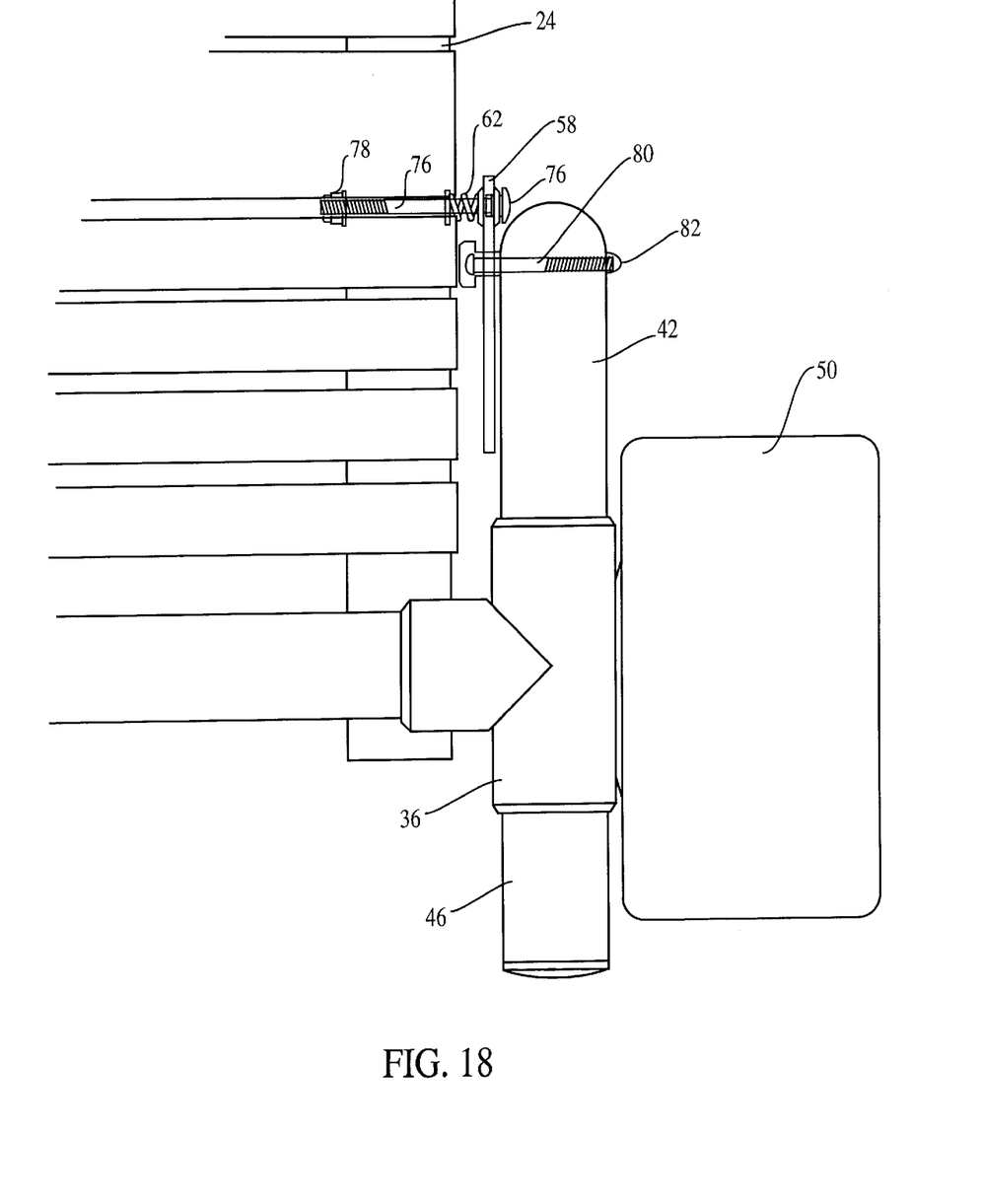
FIG. 18 is a front elevation view showing the ratchet positioning device affixed to the chair.
Figures 19A, 19B:
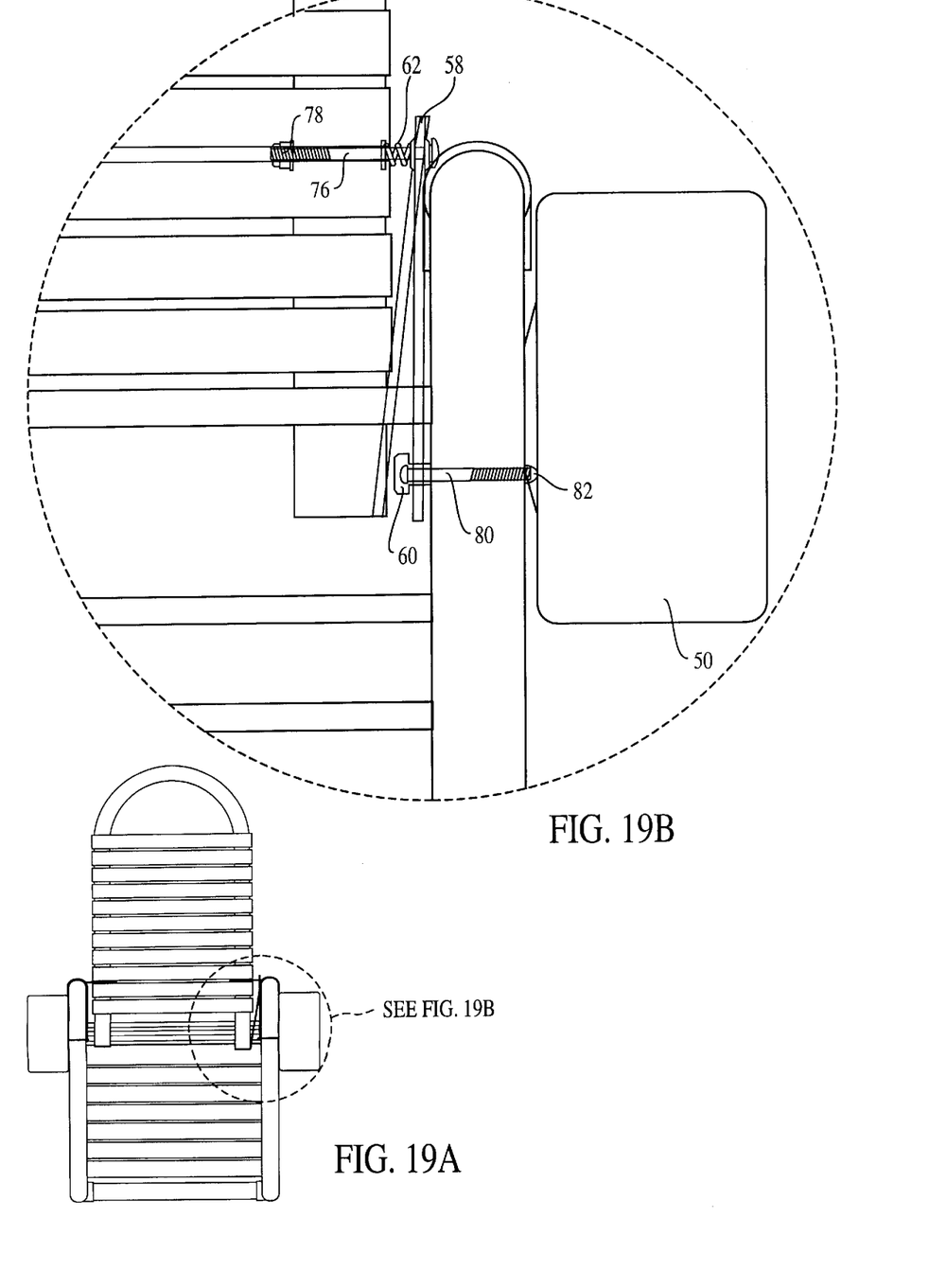
FIG. 19 is an enlarged top plan view of the ratchet positioning member being engaged and disengaged with the ratcheting positioning guidepost.
Figure 20:
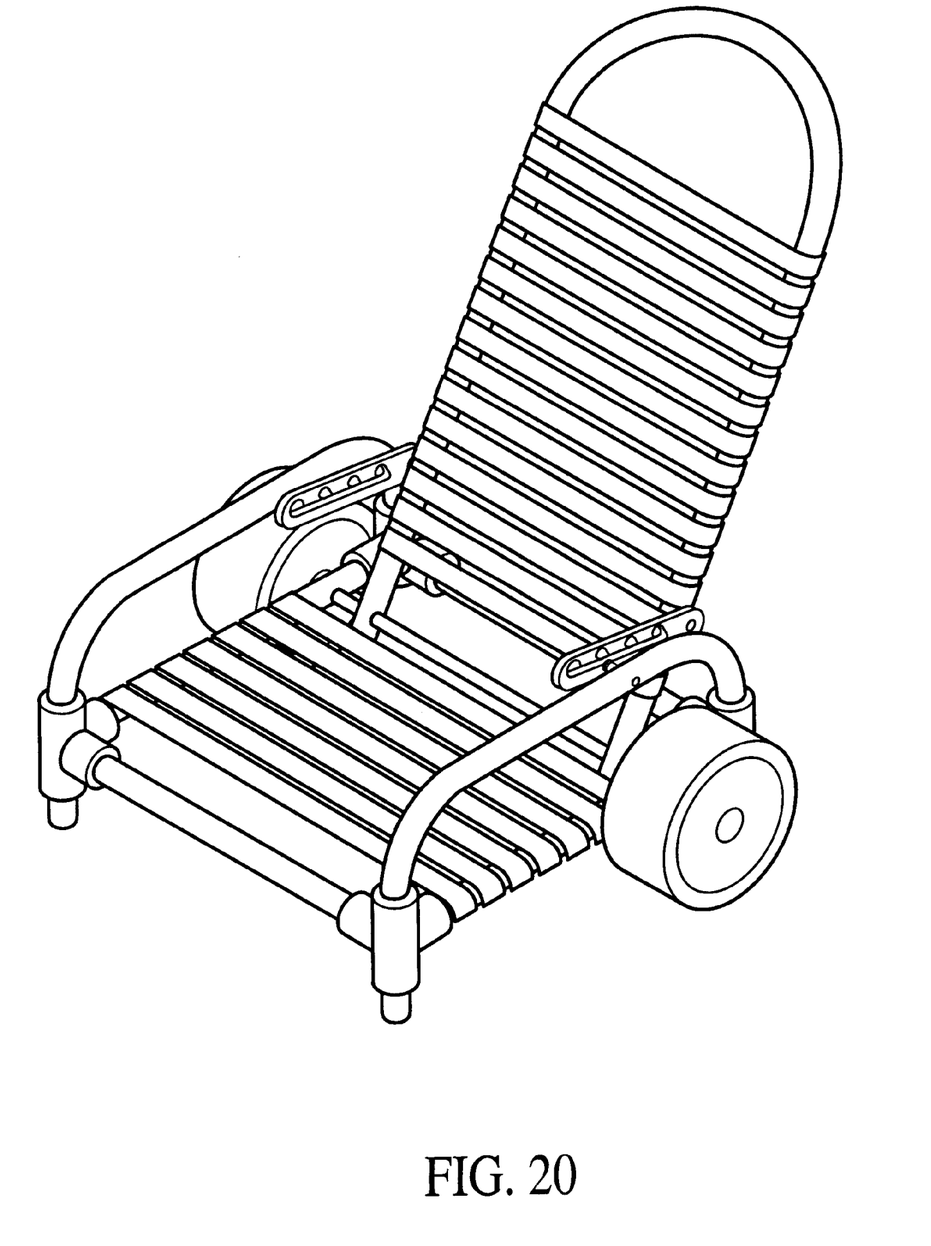
FIG. 20 is a perspective view of the chair.

At one end of the channel is a rounded circular opening 74 which is slightly larger than the ratchet positioning guidepost, to allow the guidepost to be engaged and disengaged from the ratchet member (FIG. 16). The ratchet member is affixed to the frame of the back support member by a bolt 76 or other suitable affixing means (FIG. 10). The bolt is inserted through the spring, which has washers on either side of it. The bolt is then placed through the proximal holes of the back support member. A washer 64 and locknut 78 are used to hold the bolt in place. The spring is used to help maintain the integrity of the position of the ratchet member; it also provides flexibility to allow the ratchet member to yield from its position and allow it to be engaged and disengaged from the ratchet positioning guidepost as shown in FIG. 19.

The ratchet positioning guidepost is fastened to the armrest portion of the seat support member by a bolt 89 that is inserted through the holes 43 in the armrest and by a locknut 82 or other suitable fastening means as shown in FIGS. 10 and 11. The guidepost has a recessed area 84 which allows the head of the bolt 80 to be securely positioned within it.

The ratchet positioning device operates by engaging the ratchet member with the ratchet positioning guidepost (FIG. 16). This is accomplished by inserting the rounded portion of the channel over the ratchet positioning post, with the back support member in an upright position. The back support member can then be adjusted to different seating positions by moving the back support member until the guidepost is locked into a slotted area of the ratchet member so that a desired seating position is achieved. If the user of the chair desires to place the back support member in a horizontal position, the ratchet member can be disengaged from the ratchet positioning guidepost and the back support member can be moved into a horizontal position until the ground support member makes contact with the ground.

The recreational chair can also be used as a transport cart. This can be accomplished by engaging the ratchet member with the ratchet positioning guidepost, and locking it into one of the slotted areas, preferably the area located proximally to the swivel hole. The items to be transported are then placed on the seat support member; then the back support member is tilted backward and the cart is free to move on the wheels. The seat support member remains in a fixed angle with the back support member while the items are being transported.

Another useful feature of the chair is that it may be folded in a compact position for storage or for being transported in a vehicle. When the ratchet member is disengaged from the ratchet positioning guidepost, the back support member can be folded forward against the seat support member, thereby allowing the chair to be stored and transported easily.

I claim:

1. A recreational chair which is adapted to be folded for storage and useful as transport cart comprising a seat member having mounted thereon arm rests and an axle with spaced apart wheels, said arm rests having a first pair of pivot pins therein, a back support member with ends pivotally mounted on said axle and having a second pair of pivot pins spaced from said axle, rachet members mounted on said second pivot pins wherein said ratchet members comprise an elongated member having a central channel interconnected to a first opening adapted to receive said first set of pins, a second opening spaced from and remote from said channel adapted to receive said second set of pins, and a plurality of slots interconnected to said central channel wherein each slot is adapted to engage or disengage said first set of pins whereby said back support member can be positioned in a plurality of positions such as a vertical position to use said chair as a transport chair, a horizontal position for storage or reclining, and angled positions for use as a recreational chair.

2. A recreational chair as set forth in claim 1 wherein said first and second sets of pins are bolts mounted in said back support member and in said arm rests.

3. A recreational chair which is adapted to be folded for storage and useful as transport cart comprising a seat member having mounted thereon arm rests and an axle with spaced apart wheels, said arm rests having a first pair of pivot pins therein, a back support member with ends pivotally mounted on said axle and having a second pair of pivot pins spaced from said axle, rachet members mounted on said second pivot pins wherein said ratchet members comprise an elongated member having a central channel interconnected to a first opening adapted to receive said first set of pins, a second opening spaced from and remote from said channel adapted to receive said second set of pins, and a plurality of slots interconnected to said central channel wherein each slot has a lobular configuration adjacent to the slot opening which inhibits the accidental disengagement of said first set of pins whereby said back support member can be positioned in a plurality of positions such as a vertical position to use said chair as a transport chair, a horizontal position for storage or reclining, and angled positions for use as a recreational chair.

4. A recreational chair as set forth in claim 3 wherein said first and second sets of pins are bolts mounted in said back support member and in said arm rests.

5. A recreational chair which is adapted to be folded for storage and useful as a transport cart comprising a seat member having mounted thereon arm rests and an axle with spaced apart wheels, said arm rests having a first pair of pivot pins therein, a back support member with ends pivotally mounted on said axle and having a second pair of pivot pins spaced from said axle, rachet members mounted on said second pivot pins with a tension device to separate said rachet members from said back support members wherein said ratchet members comprise an elongated member having a central channel interconnected to a first opening adapted to receive said first set of pins, a second opening spaced from and remote from said channel adapted to receive said second set of pins, and a plurality of slots interconnected to said central channel wherein each slot is adapted to engage or disengage said first set of pins whereby said back support member can be positioned in a plurality of positions such as a vertical position to use said chair as a transport chair, a horizontal position for storage or reclining, and angled positions for use as a recreational chair.

6. A recreational chair as set forth in claim 5 wherein said tension device comprises a spring to separate said rachet members from said back support members.

7. A recreational chair which is adapted to be folded for storage and useful as a transport cart comprising a seat member having mounted thereon arm rests and an axle with spaced apart wheels, said arm rests having a first pair of pivot pins therein, a back support member with ends pivotally mounted on said axle and having a second pair of pivot pins spaced from said axle, rachet members mounted on said second pivot pins and said pins have a tension device to separate said rachet members from said back support members wherein said ratchet members comprise an elongated member having a central channel interconnected to a first opening adapted to receive said first set of pins, a second opening spaced from and remote from said channel adapted to receive said second set of pins, and a plurality of slots interconnected to said central channel wherein each slot has a lobular configuration adjacent to the slot opening which inhibits the accidental disengagement of said first set of pins whereby said back support member can be positioned in a plurality of positions such as a vertical position to use said chair as a transport chair, a horizontal position for storage or reclining, and angled positions for use as a recreational chair.

8. A recreational chair as set forth in claim 7 wherein said tension device comprises a spring to separate said rachet members from said back support members.

* * * * *